US009323980B2

(12) United States Patent
Sun et al.

(10) Patent No.: US 9,323,980 B2
(45) Date of Patent: Apr. 26, 2016

(54) POSE-ROBUST RECOGNITION

(75) Inventors: Jian Sun, Beijing (CN); Qi Yin, Beijing (CN); Xiaoou Tang, Hong Kong (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 839 days.

(21) Appl. No.: 13/107,856

(22) Filed: May 13, 2011

(65) Prior Publication Data
US 2012/0288167 A1 Nov. 15, 2012

(51) Int. Cl.
G06K 9/46 (2006.01)
G06K 9/00 (2006.01)
G06K 9/42 (2006.01)
G06T 3/60 (2006.01)
G06K 9/62 (2006.01)

(52) U.S. Cl.
CPC ........ *G06K 9/00281* (2013.01); *G06K 9/00221* (2013.01); *G06K 9/00228* (2013.01); *G06K 9/00268* (2013.01); *G06K 9/00288* (2013.01); *G06K 9/42* (2013.01); *G06K 9/46* (2013.01); *G06K 9/6212* (2013.01); *G06T 3/60* (2013.01)

(58) Field of Classification Search
USPC ......... 382/115–118, 155, 156, 159, 160, 173, 382/181, 190, 195, 209, 224, 227, 282, 382/294–298
See application file for complete search history.

(56) References Cited

U.S. PATENT DOCUMENTS 5,802,208 A 9/1998 Podilchuk et al.
5,828,769 A * 10/1998 Burns ........................... 382/118
6,154,559 A * 11/2000 Beardsley ..................... 382/103
6,181,805 B1 1/2001 Koike et al.
6,301,370 B1 10/2001 Steffens et al.
6,671,391 B1 12/2003 Zhang et al.
6,944,319 B1 9/2005 Huang et al.
6,975,750 B2 12/2005 Yan et al.
7,142,697 B2 11/2006 Huang et al.
7,203,346 B2 4/2007 Kim et al.
7,254,257 B2 8/2007 Kim et al.
7,542,592 B2 6/2009 Singh et al.
7,840,081 B2 * 11/2010 Paschalakis et al. .......... 382/236
7,848,548 B1 12/2010 Moon et al.
7,876,320 B2 1/2011 Marugame
7,894,640 B2 2/2011 Itou (Continued)

OTHER PUBLICATIONS

Xiaoyang Tan and Bill Triggs, "Fusing Gabor and LBP Feature Sets for Kernel-Based Face Recognition", Springer Berlin Heidelberg, Analysis and Modeling of Faces and Gestures, Lecture Notes in Computer Science, vol. 4778, 2007, pp. 235-249.*

(Continued)

*Primary Examiner* — Eric Rush
(74) *Attorney, Agent, or Firm* — Steve Wight; Sandy Swain; Micky Minhas

(57) ABSTRACT

Some implementations provide techniques and arrangements to address intrapersonal variations encountered during facial recognition. For example, some implementations transform at least a portion of an image from a first intrapersonal condition to a second intrapersonal condition to enable more accurate comparison with another image. Some implementations may determine a pose category of an input image and may modify at least a portion of the input image to a different pose category of another image for comparing the input image with the other image. Further, some implementations provide for compression of data representing at least a portion of the input image to decrease the dimensionality of the data.

20 Claims, 9 Drawing Sheets

(56) References Cited

U.S. PATENT DOCUMENTS

| | | | |
|---|---|---|---|
| 8,073,287 B1* | 12/2011 | Wechsler et al. | 382/118 |
| 8,098,938 B1* | 1/2012 | Buddemeier et al. | 382/207 |
| 8,180,112 B2 | 5/2012 | Kurtz et al. | |
| 8,249,310 B2* | 8/2012 | Okubo | 382/118 |
| 8,472,722 B2 | 6/2013 | Nayar et al. | |
| 8,532,344 B2 | 9/2013 | Connell et al. | |
| 2003/0007669 A1 | 1/2003 | Martinez | |
| 2003/0169908 A1* | 9/2003 | Kim et al. | 382/118 |
| 2004/0170305 A1* | 9/2004 | Kim et al. | 382/118 |
| 2005/0013507 A1* | 1/2005 | Lee et al. | 382/284 |
| 2006/0034517 A1* | 2/2006 | Bober et al. | 382/118 |
| 2006/0067573 A1* | 3/2006 | Parr et al. | 382/154 |
| 2006/0120571 A1* | 6/2006 | Tu et al. | 382/118 |
| 2008/0212899 A1* | 9/2008 | Gokturk et al. | 382/305 |
| 2008/0310687 A1 | 12/2008 | Hua et al. | |
| 2008/0310720 A1* | 12/2008 | Park et al. | 382/118 |
| 2009/0060290 A1 | 3/2009 | Sabe et al. | |
| 2009/0180671 A1 | 7/2009 | Lee et al. | |
| 2009/0180672 A1 | 7/2009 | Ishiyama | |
| 2009/0196467 A1 | 8/2009 | Okubo | |
| 2009/0309878 A1* | 12/2009 | Otani et al. | 345/427 |
| 2010/0049675 A1* | 2/2010 | Ning et al. | 706/12 |
| 2010/0246906 A1 | 9/2010 | Lovell et al. | |
| 2010/0284577 A1 | 11/2010 | Hua et al. | |
| 2011/0293189 A1* | 12/2011 | Sun et al. | 382/195 |

OTHER PUBLICATIONS

Ahonen et al., "Face Description with Local Binary Patterns: Application to Face Recognition," retrieved at <<http://citeseerx.ist.psu.edu/viewdoc/download?doi=10.1.1.106.6396&rep=rep1&type=pdf>>, IEEE Transactions on Pattern Analysis and machine Intelligence, Dec. 2006, 15 pages.

Belhumeur et al., "Eigenfaces vs. Fisherfaces—Recognition using Class Specific Linear Projection," retrieved at <<http://ieeexplore.ieee.org/stamp/stamp.jsp?tp=&arnumber=598228>>, IEEE Transactions on Pattern Analysis and Machine Intelligence, vol. 19, No. 7, Jul. 1997, 10 pages.

Blanz et al., "Face Recognition Based on Fitting a 3D Morphable Model," retrieved at <<http://ieeexplore.ieee.org/stamp/stamp.jsp?tp=&arnumber=1227983>>, IEEE Transactions on Pattern Analysis and Machine Intelligence, vol. 25, No. 9, Sep. 2003, 12 pages.

Cao et al., "Face Recognition with Learning-based Descriptor," retrieved at <<http://research.microsoft.com/en-us/um/people/jiansun/papers/cvpr10_facereco.pdf>>, 2010 IEEE Computer Society Conference on Computer Vision and Pattern Recognition, Jun. 13-18, 2010, San Francisco, CA, 8 pages.

Chang et al., "LIBSVM: a Library for Support Vector Machines," retrieved at <<http://www.csie.ntu.edu.tw/~cjlin/papers/libsvm.pdf>>, Initial version: 2001, Last updated Jan. 1, 2011, 32 pages.

Choi et al., "An Effective Face Recognition under Illumination and Pose Variations", 2007, retrieved at <<http://csl.snu.ac.kr/publication/paper/07IJCNN_final_paper.pdf>>, 6 pages.

Cootes et al., "Active Appearance Models," retrieved at <<http://www.isbe.man.ac.uk/~bim/Models/eccv98_aam.pdf>>, Proc. European Conference on Computer Vision 1998, vol. 2, pp. 484-498, Springer, 1998.

Dalal et al., "Histograms of Oriented Gradients for Human Detection," retrieved at <<http://ljk.imag.fr/membres/Bill.Triggs/pubs/Dalal-cvpr05.pdf>>, 2005 IEEE Computer Society Conference on Computer Vision and Pattern Recognition, Jun. 20-26, 2005, San Diego, CA, 8 pages.

Face Recognition, National Science and Technology Council, retrieved at <<http://www.biometricscatalog.org/NSTCSubcommittee/Documents/Face%20Recognition.pdf>>, Mar. 27, 2006, 10 pages.

Gross et al., "Multi-PIE," retrieved at <<http://research.microsoft.com/pubs/69512/multipie-fg-08.pdf>>, IEEE (c) 2008, 8 pages.

Guillaumin et al., "Is that you? Metric Learning Approaches for Face Identification", 2009 IEEE 12th International Conference on Computer vision, retrieved at <<http://ieeexplore.ieee.org/stamp/stamp.jsp?tp=&arnumber=5459197>>, 8 pages.

Hawkins et al, "On Intelligence". Times Books, Henry Holt and Company, New York, 2004, retrieved from <<http://bib.tiera.ru/DVD-016/Hawkins_J.,_Blakeslee_S._On_Intelligence_(2005)(en)(98s).pdf>>, 98 pages.

Hua et al., "A Robust Elastic and Partial Matching Metric for Face Recognition," retrieved at <<http://users.eecs.northwestern.edu/~ganghua/publication/ICCV09a.pdf>>, IEEE 12th Interational Conference on Computer Vision, Sep. 29-Oct. 2, 2009, 8 pages.

Hua et al., "Face Recognition using Discriminatively Trained Orthogonal Rank One Tensor Projections", IEEE Conference on Computer Vision and pattern Recognition, Jun. 17-22, 2007, Menneapolis, MN, retrieved at <<http://ieeexplore.ieee.org/stamp/stamp.jsp?tp=&arnumber=4270132>>, 8 pages.

Huang et al., "Labeled Faces in the Wild: A Database for Studying Face Recognition in Unconstrained Environments," retrieved at <<http://www.tamaraberg.com/papers/lfw.pdf>>, Technical Report 07-49, UMass, 2007, 11 pages.

Huang et al., "Unsupervised Joint Alignment of Complex Images," retrieved at <<http://citeseerx.ist.psu.edu/viewdoc/download-?doi=10.1.1.64.9868&rep=rep1&type=pdf>>, IEEE 11th International Conference on Computer Vision, Oct. 14-21, 2007, 8 pages.

Karande et al., "Face Recognition under Variation of Pose and Illumination using Independent Component Analysis," retrieved at <<http://www.icgst.com/gvip/volume8/issue4/p1150802003.pdf>>, ICGST-GVIP, ISSN 1687-398X, vol. 8, Issue (IV), Dec. 2008, 6 pages.

Kim et al., "Locally Linear Discriminant Analysis for Multimodally Distributed Classes for Face Recognition with a Single Model Image", IEEE Transactions on Pattern Analysis and Machine Intelligence, vol. 27, No. 3, Mar. 2005, pp. 318-327.

Kramer, "Nonlinear Principal Component Analysis using Autoassociative Neural Networks", AIChE Journal, Feb. 1991, vol. 37, No. 2, retrieved from <<http://math.stanford.edu/research/comptop/references/kr.pdf>>, pp. 233-243.

Kumar et al., "Attribute and Simile Classifiers for Face Verification," retrieved at <<http://www1.cs.columbia.edu/~belhumeur/conference/iccv09.pdf>>, IEEE 12th International Conference on Computer Vision, Sep. 29-Oct. 2, 2009, 8 pages.

Kumar et al., "FaceTracer: A Search Engine for Large Collections of Images with Faces", Proceedings of the 10th European Conference on Computer Vision: Part IV, 2008, retrieved from <<http://www1.cs.columbia.edu/CAVE/publications/pdfs/Kumar_ECCV08.pdf>>, 14 pages.

Lee et al., "Face Verification and Identification using Facial Trait Code," retrieved at <<http://ieeexplore.ieee.org/stamp/stamp.jsp?tp=&arnumber=5206830>>, IEEE (d) 2009, 8 pages.

Liang et al., "Face Alignment via Component-based Discriminative Search," retrieved at <<http://research.microsoft.com/en-us/um/people/jiansun/papers/ECCV08_FaceAlign.pdf>>, European Conference on Computer Vision. 2008, 14 pages.

LIBSVM: A Library for Support Vector Machines, retrieved at <<http://www.csie.ntu.edu.tw/~cjlin/papers/libsvm.pdf>>, Inital version: 2001, Last updated: Mar. 13, 201, 39 pages.

Liu et al., "Face Recognition using Kernel Based Fisher Discriminant Analysis", IEEE International Confrence on Automatic Face and Gestur Recognition, 2002, retrieved from <<http://paul.rutgers.edu/~ruihuang/papers/qliu_fgr02.pdf>>, 5 pages.

Lowe, "Distinctive Image Features from Scale-Invariant Keypoints," retrieved at <<http://citeseerx.ist.psu.edu/viewdoc/download?doi=10.1.1.157.3843&rep=rep1&type=pdf>>, International Journal of Computer Vision, 2004, 28 pages.

Moghaddam et al., "Bayesian Face Recognition", TR2000-53, Feb. 2002, retrieved from <<http://www.cs.columbia.edu/~jebara/papers/TR2000-42.pdf>>, 16 pages.

Ojala et al., "Multiresolution Gray-Scale and Rotation Invariant Texture Classification with Local Binary Patterns," retrieved at <<http://citeseerx.ist.psu.edu/viewdoc/download?doi=10.1.1.95.7277&rep=rep1&type=pdf>>, IEE Transactions on Pattern Analysis and machine Intelligence, Jul. 2002, 17 pages.

(56) References Cited

OTHER PUBLICATIONS

Pinto et al., "How Far can you get with a Modern Face Recognition Test Set using only Simple Features?" retrieved at <<http://ieeexplore.ieee.org/stamp/stamp.jsp?tp=&arnumber=5206605>>, IEEE (c) 2009, 8 pages.

Rodriguez, "Face Detection and Verification using Local Binary Patterns," retrieved at <<http://www.idiap.ch/~rodrig/publications/pdf/rodrig-thesis-2006.pdf>>, Lausanne, 2006, 150 pages.

Shan et al., "Extended Fisherface for Face Recognition from a Single Example Image per Person", 2002 IEEE International Symposium on Circuits and Systems, May 26-29, 2002, Phoenix-Scottsdale, AZ, retrieved at <<http://ieeexplore.ieee.org/xpl/freeabs_all.jsp?arnumber=1010929>>, 4 pages.

Su et al., "Adaptive Generic Learning for Face Recognition from a Single Sample per Person", 2010 IEEE Computer Society Conference on Computer Vision and Pattern Recognition, Jun. 13-18, 2010, San Francisco, CA, retrieved at <<http://yoshi.cs.ucla.edu/upload/CVPR10/data/papers/1611.pdf>>, 8 pages.

Taigman et al., "Multiple One-Shots for Utilizing Class Label Information," retrieved at <<http://www.openu.ac.il/home/hassner/projects/multishot/TWH_BMVC09_Multishot.pdf>>, (c) 2009, 12 pages.

Tan et al., "Enhanced Local Texture Feature Sets for Face Recognition under Difficult Lighting Conditions", Proceedings of the 3rd international conference on Analysis and modeling of faces and gestures, Springer-Verlag Berlin, Heidelberg, 2007, retrieved at <<http://class.inrialpes.fr/pub/201-tan-amfg07a.pdf>>, 15 pages.

Tang et al., "Face Sketch Recognition", IEEE Transactions on Circuits and Systems for Video Technology, vol. 14, No. 1, Jan. 2004, retrieved at <<http://www.ee.cuhk.edu.hk/~xgwang/papers/wangTcsvt04.pdf>>, 8 pages.

Tang, "Texture Information in Run-Length Matrices," retrieved at <<http://ieeexplore.ieee.org/stamp/stamp.jsp?tp=&arnumber=725367>>, IEEE transactons on Image Processing, vol. 7, No. 11, Nov. 1998, 8 pages.

Turk et al., "Face Recognition using Eigenfaces," retrieved at <<http://ieeexplore.ieee.org/stamp/stamp.jsp?tp=&arnumber=139758>>, IEEE (c) 1991, 6 pages.

Wang et al., "A Unified Framework for Subspace Face Recognition," retrieved at <<http://ieeexplore.ieee.org/stamp/stamp.jsp?tp=&arnumber=1316855>>, IEEE Transactions on Pattern Analysis and Machine Intelligence, vol. 26, No. 9, Sep. 2004, 7 pages.

Wang et al., "Improving Face Recognition by Online Image Alignment," retrieved at <<http://ieeexplore.ieee.org/stamp/stamp.jsp?tp=&arnumber=1698895>>, Proceedings of the 18th International Conference on Pattern Recognition (ICPR'06), (c) 2006, 4 pages.

Wang et al., "On solving the face recognition problem with one training sample per subject", retrieved at <<http://www.comm.toronto.edu/~kostas/Publications2008/pub/90.pdf>>, Pattern Recognition, vol. 39, Issue 9, Sep. 2006, pp. 1746-1762.

Wang et al., "Random Sampling for Subspace Face Recognition," retrieved at <<http://citeseerx.ist.psu.edu/viewdoc/download?doi=10.1.1.92.7073&rep=rep1&type=pdf>>, International Journal of Computer Vision 70(1), 91-104, 2006, 14 pages.

Wiskott et al., "Face Recognition by Elastic Bunch Graph Matching," retrieved at <<http://ieeexplore.ieee.org/stamp/stamp.jsp?tp=&arnumber=598235&userType=inst>>, IEEE Transactions on Pattern Analysis and Machine Intelligence, vol. 19, No. 7, Jul. 1997, 5 pages.

Wolf et al., "Descriptor based Methods in the Wild," retrieved at <<http://www.openu.ac.il/home/hassner/projects/Patchlbp/WolfHassnerTaigman_ECCVW08.pdf>>, In Real-Life Images workshop at ECCV, 2008, 14 pages.

Wolf et al., "Similarity Scores based on Background Samples," retrieved at <<http://www.openu.ac.il/home/hassner/projects/bgoss/ACCV09WolfHassnerTaigman.pdf>>, In Asian computer vision conference, ACCV, Sep. 2009, 10 pages.

Wright et al., "Implicit Elastic Matching with Random Projections for Pose-Variant Face Recognition," retrieved at <<http://ieeexplore.ieee.org/stamp/stamp.jsp?tp=&arnumber=5206786>>, IEEE (c) 2009, 8 pages.

Yang et al., "Face Recognition using Kernel Eigenfaces", IEEE (c) 2000, retrieved at <<http://ieeexplore.ieee.org/stamp/stamp.jsp?tp=&arnumber=900886>>, 4 pages.

Zhang et al., "Face Detection based on Multi-Block LBP Representation," retrieved at <<http://nlpr-web.ia.ac.cn/2007papers/gjhy/gh101.pdf>>, Lecture Notes in Computer Science, 2007, vol. 4642/2007, 9 pages.

Office action for U.S. Appl. No. 13/107,800, mailed on Jan. 16, 2014, Sun, et al., "Association and Prediction in Facial Recognition", 26 pages.

Final Office Action for U.S. Appl. No. 13/107,800, mailed on Aug. 1, 2014, Sun, et al., "Association and Prediction in Facial Recognition", 44 pages.

Office action for U.S. Appl. No. 13/107,800, mailed on Apr. 7, 2015, Sun et al., "Association and Prediction in Facial Recognition," 47 pages.

\* cited by examiner

POSE-ROBUST RECOGNITION

BACKGROUND

Automated facial recognition typically involves capturing an image of a face for recognition and then comparing various features from the captured image against corresponding features in one or more stored images to attempt to identify a match between the captured image and the one or more stored images. This appearance-based approach to facial recognition is popular because of its simplicity and good performance. However, this approach is of limited usefulness when there is a large intrapersonal variation between the captured image and the one or more stored images. Examples of such intrapersonal variations may include different viewing angles or poses, different levels of illumination, different facial expressions, partially obscured facial features, aging, and the like. For instance, when an image of a person is captured from a side angle, conventional facial recognition techniques may have difficulty matching the captured image with a stored image of the same person taken, for example, from a frontal pose.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations disclosed herein provide techniques and arrangements to address intrapersonal variations encountered during facial recognition. For example, some implementations transform at least a portion of an image from a first intrapersonal condition to a second intrapersonal condition to enable more accurate comparison with another image. Some implementations may determine a pose category of an input image and may modify at least a portion of the input image to a different pose category of another image for comparing the input image with the other image. Further, some implementations provide for compression of data representing at least a portion of the input image to decrease the dimensionality of the data.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

DETAILED DESCRIPTION

Intrapersonal Variations in Recognition

Figure 1:
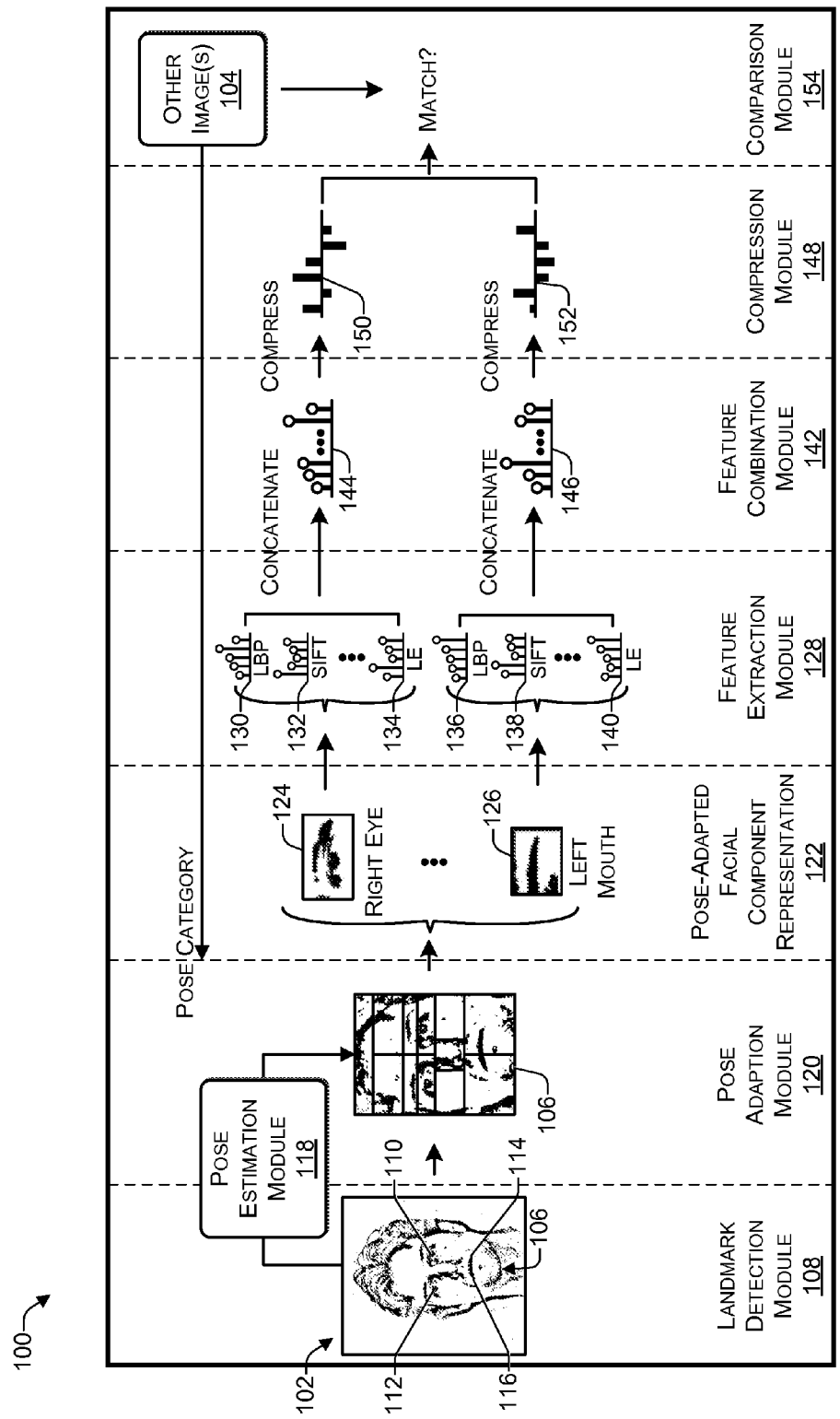
FIG. 1 illustrates an example framework for facial recognition according to some implementations.

The technologies described herein generally relate to automated recognition. Some implementations provide techniques to manage intrapersonal variations during facial recognition or other recognition tasks. Intrapersonal variations in qualities or settings (e.g., differences in pose angles, differences in illumination levels, differences in expressions, and/or partially obscured images) may provide a challenge when attempting to achieve high accuracy in facial recognition. Some implementations herein can receive an input image having a first intrapersonal setting, such as a first pose angle, and enable comparison of features in the input image with features in another image having a different intrapersonal setting, such as a second pose angle that is different from the first pose angle. Further, some implementations herein are described in the context of different pose angles as an example of an intrapersonal variation used for describing details of various implementations. However, the implementations herein are not limited to being applied to differences in pose angles, and may be applied to other intrapersonal variations, such as differences in illumination levels, differences in expressions, partially obscured images, and so forth.

Some instances may receive an input image and employ a landmark detection module to extract one or more facial landmarks (e.g., eyes, mouth corners, nose, or the like) from the input image. A pose estimation module may estimate a pose category for the input image from among a plurality of potential pose categories. Further, a pose-adaption module may perform pose-adaptive alignment to align one or more facial components of the input image based on at least one detected landmark and at least one estimated pose category. Additionally, for each of one or more facial components of the input image, a feature extraction module may extract multiple low-level descriptors. In some implementations, a feature combination module may concatenate the multiple descriptors to form a combined feature vector. Additionally, in some implementations, a compression module may apply compression to the concatenated feature vector to generate a final descriptor that is representative of the one or more facial components. In some implementations, the compression module may apply a two-layer compression technique to generate the final descriptor for the one or more facial components. Furthermore, the one or more facial components of the input image may be compared with one or more corresponding facial components from one or more other images to attempt to identify a match. For example, one or more distances may be calculated for determining facial component similarity with corresponding facial components of the one or more other images. The facial component similarity scores may be combined or fused through a suitable combining technique for determining whether there is a match between the input image and the one or more other images.

As mentioned above, conventional face recognition systems are limited by the negative effects intrapersonal variations. For example, when there is a large pose variation (e.g., frontal, profile, looking down, looking up, and so forth), conventional face recognition systems may perform poorly in real-life scenarios. Some implementations herein provide techniques to explicitly handle intrapersonal variations, such as pose variations, for robustly representing a face under varying intrapersonal conditions. For example, some implementations perform pose-adaptive geometric rectification and symmetrical flipping of facial components to normalize pose variations. Thus, implementations herein provide a pose-adaptive, facial-component-alignment approach to explicitly handle pose variations. Further, some instances may align each facial component using an optimized pose-specific two-dimensional (2D) affine rectification. Accordingly, the approach herein may determine an estimated pose category of the input face and a pose category of another face with which the input face is to be compared. The pose adaption module may adapt the pose of at least a portion of the input face to the pose category of the other face.

Additionally, some implementations may apply a symmetric flipping technique to handle one or more occluded facial portions or components. For example, if the right eye is not fully visible, but the left eye is visible, the left eye may be symmetrically flipped and used as a substitute for the occluded right eye. Additionally, some instances employ local perturbation on facial landmark detection to refine a scale factor of individual facial components. This operation can effectively reduce negative effects that may arise due to inaccuracy in component detection and pose estimation. In other words, to make the adaptive representation more robust to the initial facial landmark detection, the local perturbation may be applied to refine a location and scale of each facial component of one or more facial components of the input face. Thus, the techniques disclosed herein are able to effectively handle appearance distortion, occlusion, and landmark detection errors.

In some implementations, multiple types of descriptors may be used to represent the one or more facial components. For example, low-level descriptors such as the local binary pattern ("LBP") descriptor, the scale invariant feature transform ("SIFT") descriptor, the Gabor descriptor, and/or one or more learning-based ("LE") descriptors, each of which is discussed additionally below, may be used to represent features of each facial component of the input face. Furthermore, some instances may combine or concatenate the multiple descriptors that represent a facial component to generate a combined feature vector representative of the facial component.

Additionally, the combined feature vector that represents a facial component may be compressed to more compactly represent the facial component. In some implementations, principal component analysis (PCA) may be employed for compressing the combined feature vector. For example, PCA is a statistical method that can be used to reduce the dimensionality of data to a smaller intrinsic dimensionality so that the data can be expressed more succinctly. Accordingly, PCA can be used to reduce or compress the amount of data provided when multiple descriptors are used to represent each facial component. In addition, to further strengthen the robustness of the face representation, some implementations herein may perform concatenation and compression of multiple descriptors of one or more facial components using a two-layer PCA technique. For example, the two-layer PCA technique may be used to fuse multiple descriptors applied to each facial component. In some implementations, the two-layer descriptor compression technique may include a whitening operation and a normalizing operation not included in standard PCA. The two-layer PCA compression technique disclosed herein may combine multiple descriptors into a single final descriptor that may represent a facial component without substantial additional computation or memory costs. Consequently, the two-layer descriptor compression herein can generate a compact, highly discriminative descriptor from multiple descriptors.

Furthermore, in some implementations, the final descriptors for one or more facial components may be compared with corresponding facial components from one or more other images to determine whether there is match between two images. For example, in some implementations, the similarity between corresponding facial components may be measured by an L2 distance, and all facial component similarity scores may be combined or fused, such as by employing a linear support vector machine (SVM). Accordingly, facial representation based on the techniques described herein may be compact and robust to variations in pose. By integrating pose-adaptive face alignment and two-layer descriptor compression, implementations herein achieve consistently superior performance over conventional techniques, while maintaining both generalization ability and transparency. Further, while implementations herein are described in the context of pose variation, the techniques may be applied to other types of intra personal variations.

Pose-Robust Recognition Framework

FIG. 1 illustrates an example of a framework 100 for pose-robust recognition according to some implementations. The framework 100 may be executed by a computing device or other particular machine specifically configured with processor-executable instructions, as discussed additionally below. In this example, suppose that an input image 102 is received for recognition. Conventional recognition techniques (e.g., appearance-based matching) may directly compare the input image 102 with one or more other images 104, without regard to a variation in point of view or pose between a face 106 in the image 102 and a face in the one or more other image(s) 104. For example, even though one or more of the other image(s) 104 may be a picture of the same person as the input image 102, direct appearance-based matching may not recognize a match when the face 106 in the input image 102 is set at a different pose angle than in the other image(s) 104.

In order to address possible pose variations, a landmark detection module 108 may extract one or more facial landmarks (e.g., pupils, mouth corners, nose, eyebrows, eye corners, or the like) from the phase 106. In some implementations, the framework 100 extracts four facial landmarks, namely the left pupil 110, the right pupil 112, the left mouth corner 114 and the right mouth corner 116; however, implementations herein are not limited to any particular facial landmarks. Based on the facial landmarks 110-116, a pose estimation module 118 may estimate a pose of the face 106. As described additionally below, a plurality of pose categories may be established for use by the framework 100 to enable identification of a pose. The pose estimation module 118 may classify the face 106 in the input image 102 into one of the established pose categories based on an orientation determined from the detected landmarks 110-116.

An adaptive alignment module 120 may apply a pose-adaptive alignment technique to align one or more facial components based on the detected landmarks 110-116, the estimated pose category of the input image, and a pose category of one or more of the other images 104. For example, in some implementations, the entire face 106 may serve as a single facial component. In other implementations, the pose-adaption module 120 may divide the face 106 into a plurality of facial components, as discussed additionally below. For instance, in some implementations, the face 106 may be divided into twelve facial components; however, implementations herein are not limited to any particular number of facial components. Thus, the pose-adaption module may separately adapt the pose of each facial component to attain a pose-adapted facial component representation 122. Thus, each facial component, such as a right-eye component 124, a left-mouth component 126, and so forth, may be separately pose-adapted and processed in the framework 100 to approximate the pose category of the one or more other images 104.

The pose adaptation may include geometric rectification of a facial component using a scale factor determined from training data. For example, training data may be used to determine how to transition a particular facial component from a first pose category to a second pose category. Further, in the case that a feature of a facial component is wholly or partially obscured, a symmetric facial component from the other side of the face may be substituted and transposed or flipped to serve as the facial component. Also, some implementations provide for local perturbation to improve the accuracy of the pose adaptation.

To enable comparison of the input face 106 with the one or more other images 104, a feature extraction module 128 may represent each of the one or more facial components using one or more descriptors. In some implementations, the feature extraction module 128 may utilize multiple low-level descriptors, such as the LBP descriptor, the SIFT descriptor, the Gabor descriptor, and/or one or more LE descriptors. For example, for the right-eye component 124, the feature extraction module 128 may extract LBP features 130, SIFT features 132, . . . , LE features 134. Further, for the left-mouth component 126, the feature extraction module 128 may extract LBP features 136, SIFT features 138, . . . , LE features 140.

A feature combination module 142 may concatenate the descriptor features extracted for each facial component to generate a combined feature vector. For example, the descriptor features 130-134 extracted for the right-eye component 124 may be concatenated to generate a right-eye feature vector 144, while the descriptor features 136-140 extracted for the left-mouth component 126 may be concatenated to generate a left-mouth feature vector 146.

A compression module 148 may compress the combined feature vector for each facial component to generate a final component descriptor that is representative of the facial component. For example, some implementations may use a two-layer PCA compression technique that combines and normalizes the combined feature vector of each facial component to produce a compact representation of the facial component. Thus, the feature vector 144 for the right-eye component 124 may be compressed to generate a final descriptor 150 representative of the right eye component 124. Similarly, the feature vector 146 for the left-mouth component 126 may be compressed to generate a final descriptor 152 representative of the left mouth component 126.

In some implementations, a comparison module 154 may compare the final descriptor for each facial component with a corresponding facial component in one or more of the other images 104. For example, in some implementations, the similarity between corresponding components may be measured by an L2 distance, and all component similarity scores may be combined or fused by a linear SVM (support vector machine). The combined or fused similarity scores may then be compared with a threshold or statistical cut off for making a determination as to whether there is a match between the input image 102 and the one or more other images 104. Further, in other implementations, other techniques may be used for combining the final descriptors 152 and/or otherwise comparing the final descriptors 102 with the one or more other images 104 for determining whether there is a match.

Example Pose Categories

Figure 2:
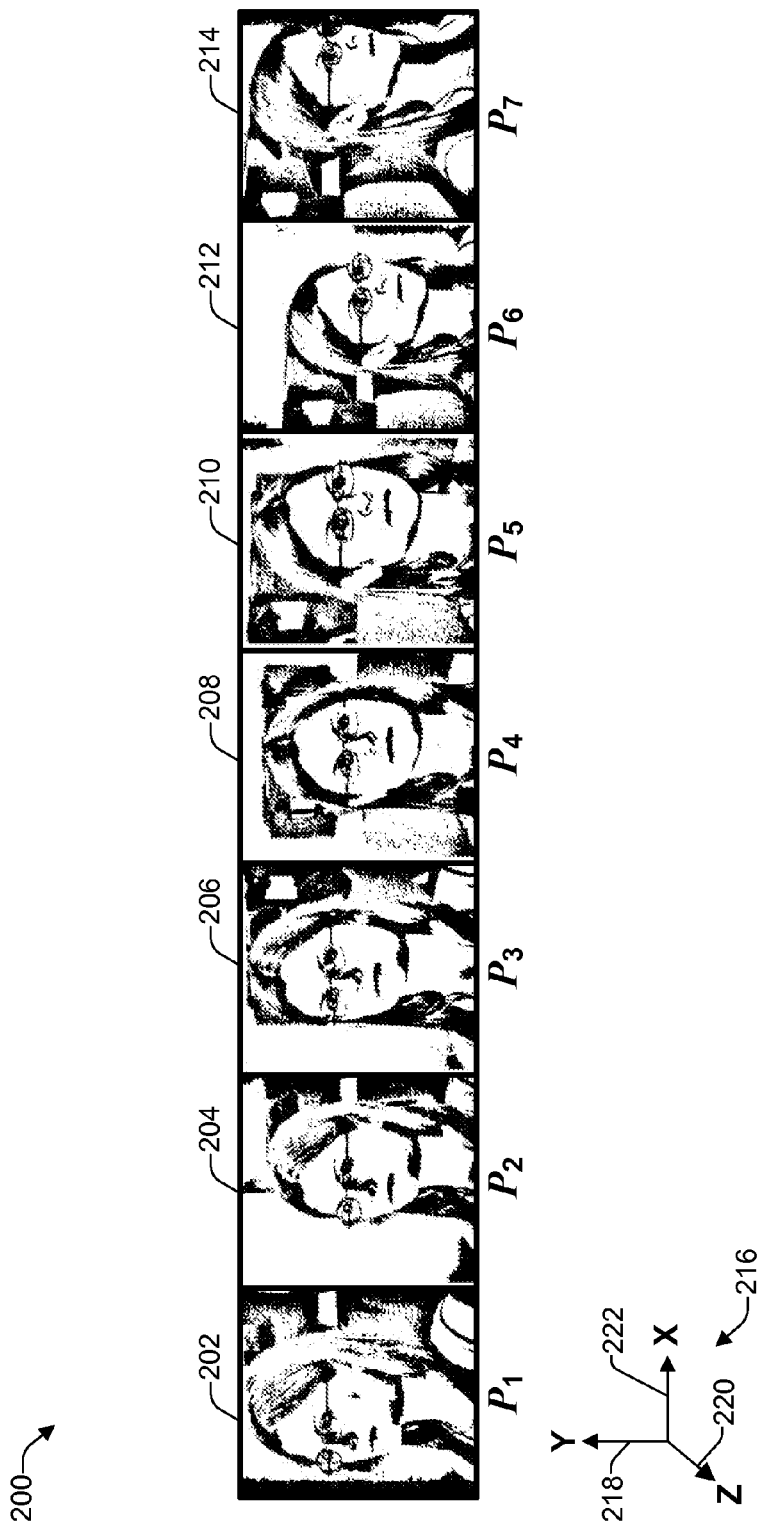
FIG. 2 illustrates examples of pose categories according to some implementations.

FIG. 2 illustrates an example of pose categories according to some implementations for an identity 200. The identity 200 is a series of images 202-214 of the same person taken at different pose angles. In this example, the identity 200 contains seven images 202-214, with each image 202-214 representing a different pose category $P_1$, $P_2$, $P_3$, . . . , $P_7$. In this example, the pose categories $P_1$-$P_7$ range from −60 degrees at $P_1$ to +60 degrees at $P_7$ to cover horizontal in-plane rotation (i.e., yaw in an x-y-z coordinate system 216), with pose category $P_4$ being a full frontal pose setting. Similar identities may be created using a plurality of different people, and may be compiled into an identity data set which may be used in as a set of training data according to some implementations herein. An example of a suitable identity dataset according to some implementations is the Multi-PIE face database which is available through Carnegie Mellon University, Pittsburgh, Pa., USA. Additionally, while the identity 200 includes seven pose categories, in other implementations, more or fewer pose categories may be established. Furthermore, the pose categories in this example are directed to differences in yaw (i.e., turn left or turn right, out-of-plane rotation about the y-axis 218) since yaw is the most common and significant pose variation, compared with roll (in-plane rotation about the z-axis 220) and pitch (out of plane rotation up or down about the x-axis 222). Furthermore, identities 200 herein may include images showing different expression, poses rotated in other directions (i.e., pitch), different lighting effects, different degrees of aging, and the like. Thus, the example identity 200 of FIG. 2 is just a non-limiting illustrative example provided for discussion purposes.

To estimate the pose of an input image, the input image may be matched against the pose categories in the training data set. As one example, some implementations may select a plurality of identities from the Multi-PIE database, each identity containing 7 pose categories to use as a training data set. All training steps, including pose estimation and parameter optimization described below may use the training data set. In some implementations, the training data set may include 200 or more separate identities. To enable the matching of pose categories, some implementations herein may average descriptors of some or all of the identities in training data set for a specific pose to generate a template model for each pose category $\{P_i|1=1, 2, 3, \ldots, 7\}$. Following generation of the template model for each pose category, implementations herein may measure the similarity between the input face 106 and the template faces, and may assign to the input face 106 a pose category of one of the templates determined to be most similar to the input face 106. Some implementations herein do not require a very accurate pose estimation because incorrectly assigning an image to a neighboring category (e.g., assigning an image to pose category $P_2$ instead of $P_3$) does not result in a dramatic change in the final representation. Moreover, some implementations may carry out a local perturbation to further refine the alignment with a pose category, as discussed additionally below. As also discussed below, some implementations adopt facial-component-level face alignment which can more accurately align each facial component without requiring balancing across the whole face. Further other intrapersonal variations in addition to pose may be categorized and similarly trained. For example, different illumination settings may be determined for the input face, different expressions, or the like, which may be used for classifying the input face according to other types of intrapersonal variations.

Facial Component Representation Example

Figure 3:
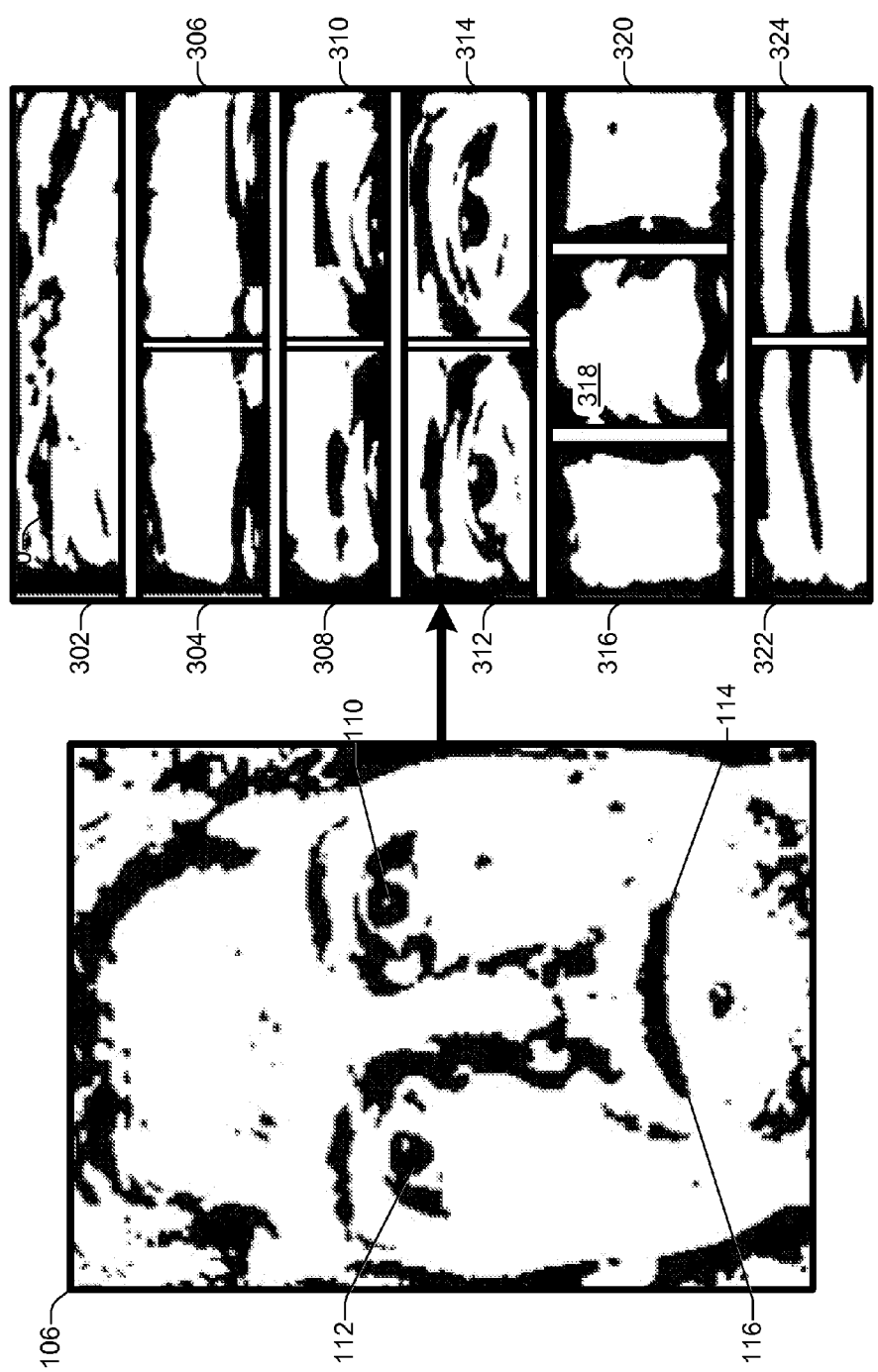
FIG. 3 illustrates an example of dividing a face into multiple facial components according to some implementations.

FIG. 3 illustrates an example facial component representation of the input face 106 according to some implementations herein. As mentioned above, some implementations may determine facial representations and similarities at the granularity of the facial component level. In the illustrated example, given the face 106 taken from the input image 102, twelve facial components 302-324 may be extracted and separately aligned based on the four detected landmarks 110-116. The facial components in this example may include a hair component 302, a right forehead component 304, a left forehead component 306, a right eyebrow component 308, a left eyebrow component 310, a right eye component 312, a left eye component 314, a right cheek component 316, a nose component 318, a left cheek component 320, a right mouth component 322 and a left mouth component 324. As mentioned above, the landmarks in this example are the left eye pupil or eye center 110, the right eye pupil or eye center 114, the left mouth corner 114 and the right mouth corner 116, although other landmarks may be used in other implementations.

The facial component division of FIG. 3 results in a plurality of facial components 302-316 and 320-324 that, with the exception of the nose 318, are generally planar. For these planar components, according to some implementations herein, a 2D transformation at the component level provides a good approximation. Further, except for the hair component 302 and the nose component 318, the remaining components 304-316 and 320-324 may be defined symmetrically. Accordingly, in some implementations, because of the bilateral symmetric structure of the face, an occluded facial component can be "copied" by flipping its symmetric component. For example, if the left eye component of a face is wholly or partially occluded, the right eye component of the face may be transposed or flipped to serve as the left eye component. Furthermore, while the example of FIG. 3 divides the face 106 into twelve facial components, more or fewer facial components may be used according to other implementations. For example, in some implementations, the entire face 106 may be a single facial component. Consequently, the implementations herein are not limited to the particular example.

Descriptor-Based Representation

As mentioned above, some implementations herein use one or more low-level descriptors for at least one of pose estimation and face representation. Numerous suitable descriptors are used conventionally in the art, and thus any suitable descriptor may be used in some implementations. Suitable low-level descriptors may include the local binary pattern ("LBP") descriptor, as described, for example, by T. Ojala, M. Pietikainen, and T. Maenpaa in "Multiresolution gray-scale and rotation invariant texture classification with local binary patterns," *IEEE Transactions on Pattern Analysis and Machine Intelligence*, 24(7):971-987, 2002. The LBP descriptor may encode the relative binary pattern between each pixel and its neighbors. For example, for the LBP descriptor, some implementations may use eight uniformly spaced circular neighbor sets (e.g., radius=3) and 59-code encoding. LBP is invariant to monotonic photometric change and easy to compare. These advantages make LBP widely used and result in many advanced variations.

Another suitable low-level descriptor may include the scale invariant feature transform ("SIFT"), as described, for example, by D. Lowe in "Distinctive image features from scale-invariant keypoints," *International Journal of Computer Vision*, 60(2):91-110, 2004. SIFT is able to quantize an image gradient into discrete codes to form an atomic element of the final descriptors. For example, with respect to the SIFT descriptor, a 32-orientation quantization may be applied in some implementations herein.

Another suitable low-level descriptor may include the Gabor descriptor, as described, for example, by L. Wiskott, J. Fellous, N. Kruger, and C. Von der Malsburg in "Face recognition by elastic bunch graph matching" *IEEE Transactions on Pattern Analysis and Machine Intelligence*, 19(7):775-779, 1997. As one example, for the Gabor descriptor, some implementations herein may use a default parameter as described by Wiskott et al. in the paper referenced above.

Yet another suitable low-level descriptor may include a learning-based ("LE") descriptor, as described, for example, by Z. Cao, Q. Yin, J. Sun, and X. Tang in "Face recognition with Learning-based Descriptor," *In Proc. IEEE Conference on Computer Vision and Pattern Recognition*, 2010. Also, with respect to the LE descriptor, some implementations herein may use the best sampling pattern and 256-code encoding, as described by Cao et al in the paper referenced above.

Some implementations herein may use one or more of the example low-level descriptors described above, other suitable low-level descriptors, or other suitable matching techniques. In some particular implementations, the LE descriptor is used for pose estimation, as having been found to be slightly more accurate than the other descriptors described above. Further, some implementations of the facial representation techniques herein may use four variant LE descriptors along with the LBP, SIFT and Gabor descriptors described above.

Additionally, to obtain a more discriminative representation of the final descriptor values, some implementations may apply a principal component analysis ("PCA") dimension reduction technique, as described for example, by Cao et al., in the paper referenced above, to obtain a compact descriptor $f_i$ for each facial component 302-324. The whole face 106 may be represented as $F=(f_1, f_2, \ldots, f_{12})$. The comparison module 154 may then determine a final similarity distance of two faces being compared. For example, some implementations may use a linear support vector machine ("SVM") to determine the similarity distance based on a fusion of the component-wise L2 distances. An example of this technique is provided, for example, by R.-E. Fan, P.-H. Chen, and C.-J. Lin in "Working Set Selection Using the Second Order Information for Training SVM," *Journal of Machine Learning Research* 6, 1889-1918, 2005. Alternatively, the comparison module may use other suitable techniques for determining the similarity between two images or portions thereof.

Example Pose Adaptive Face Alignment

Figure 4:
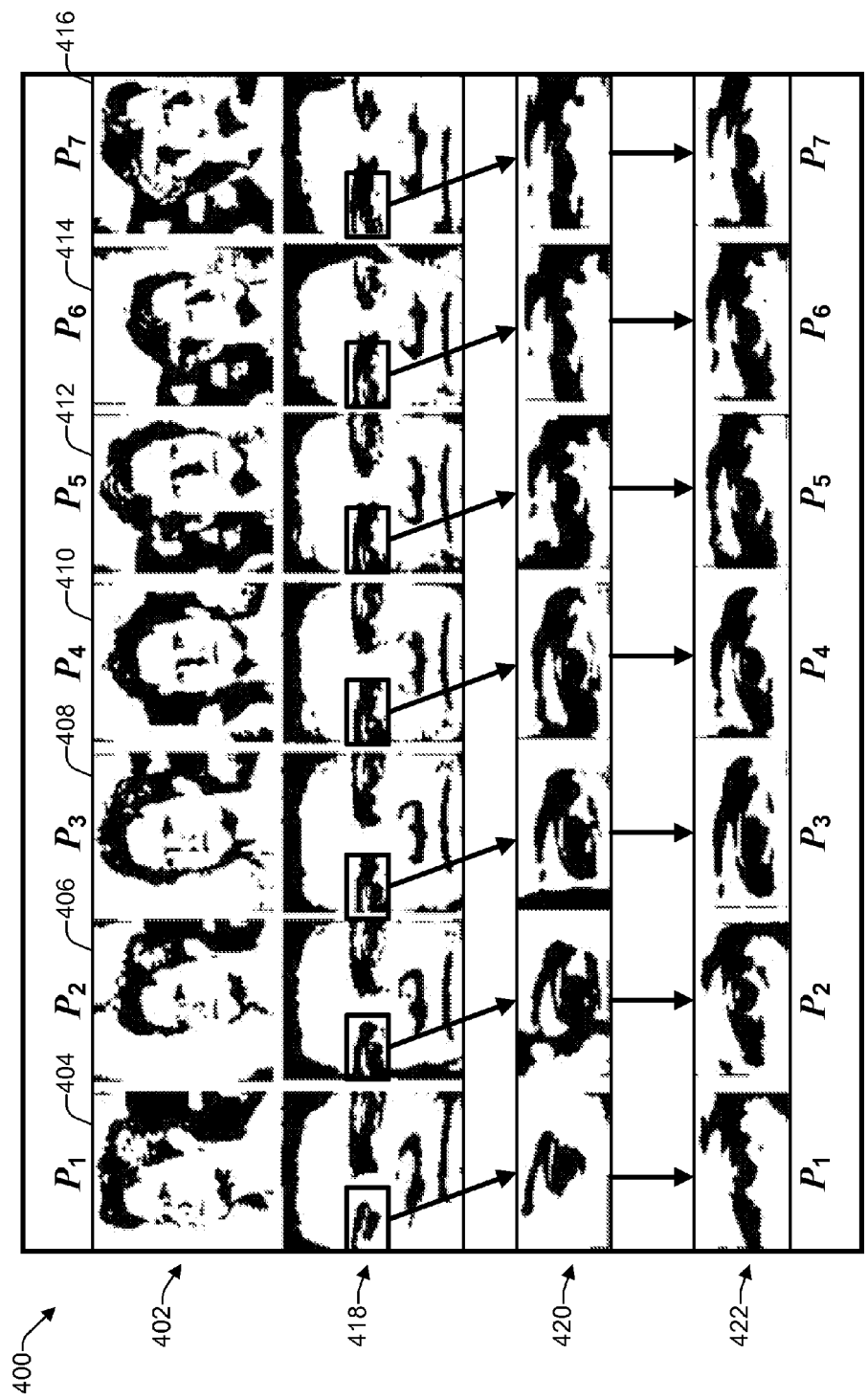
FIG. 4 illustrates an example of transforming a facial component to another pose category according to some implementations.

FIG. 4 illustrates example results 400 of pose-adaptive face alignment for facial recognition according to some implementations. In this example, an identity 402 is used to provide the input images in seven different pose categories $P_1$ through $P_7$ as described above with respect to FIG. 2. For example, suppose that it is desired to compare the faces in each of the non-frontal images 404-408 (poses $P_1$, $P_2$, $P_3$) and 412-416 (poses $P_5$, $P_6$, $P_7$) with the face in the full-frontal image 410 (pose $P_4$). In this example, pose adaptive face alignment is demonstrated using the right eye component as an example, with it being understood that the other facial components may be similarly transformed for comparison matching.

For each input image 404-408 and 412-416, facial component representation and alignment is carried out as described above with reference to FIG. 3 to provide the facial component representations 418 with the right eye components being shown in this example. Adaptive geometric rectification and/or symmetric flipping may be carried out for each right eye component 420 in each of the pose categories $P_1$, $P_2$, $P_3$ and $P_5$, $P_6$, $P_7$ to bring these right eye components 420 into the full-frontal pose category $P_4$, thereby providing transformed right eye components 422, which have been transformed into pose category $P_4$ (of course, no transformation is carried out for the right eye component of image 410). For example, with respect to the right-eye component for pose category $P_1$, because the right eye is occluded in this pose category, the left eye component may be substituted for the right eye component and symmetric flipping of the left eye component may be performed to generate the transformed right eye component 422 in the pose category $P_1$. A similar technique may be carried out for the right eye component in pose category $P_2$. For the remainder of the pose categories $P_3$, $P_5$, $P_6$, and $P_7$ adaptive geometric rectification may be performed, as described below, to correct geometric distortion. From the results in FIG. 4, it may be seen that implementations herein are able to transform an input image at the facial component level to another intrapersonal variation category to enable comparison with images in other intrapersonal variation categories.

Adaptive Geometric Rectification

For carrying out adaptive geometric rectification, some implementations herein may first apply a global affine transformation $T(\cdot)$ to bring the whole face to a canonical position. The transformation $T(\cdot)$ may be determined based on the four detected facial landmarks 110-116 (i.e., pupils and mouth corners). Across seven horizontally distributed pose categories $P_1$ through $P_7$, the inventors herein have determined that the most significant geometric distortion (mainly a foreshortening effect) is the scaling in the horizontal direction. Accordingly, some implementations herein adopt a re-scaling technique that can effectively reduce the appearance inconsistency between pose categories. In other words, for each facial component c, implementations herein may apply a pose-adaptive scale factor $s_c^k$ to correct this distortion, where $k \in \{1, 2, \ldots, 7\}$ corresponds to the pose categories. Formally, the geometric rectification of each component c may be expressed as:

$$\tilde{I}_c^k = T(I_c^k) * s_c^k, \tag{1}$$

where $I_c^k$ and $\tilde{I}_c^k$ are image patches before and after the rectification.

The values of $\{s_c^k\}$ may be optimized by an offline process over all the identities in the training data set. The optimization of $s_c^k$ may be carried out based on the following equation:

$$\begin{aligned} s_c^{k*} &= \operatorname{argmin}_{s_c^k} \sum \left| \tilde{I}_c^k - \tilde{I}_c^4 \right| \\ &= \operatorname{argmin}_{s_c^k} \sum \left| T(I_c^k) * s_c^k - T(I_c^4) * s_c^4 \right|, \end{aligned} \tag{2}$$

where the summation $\Sigma$ runs over all possible pairs (i.e., pairs of faces from the same identity) in the training data set. The aim of the above optimization is to make the image appearances under various poses close to the appearances under the frontal pose $P_4$. The distance $|\cdot|$ measures the appearance similarity. Some implementations herein may use the raw pixel distance for determining the similarity distance. In some implementations, the optimization may be performed using a brute force search by setting a step size of $s_c^k$ as 0.1, for example. In these implementations, $s_c^4$ (i.e., the frontal pose $P_4$) is equal to 1, $s_c^k$ (k=1, 2, 3) is greater than 1 for the left-side components and smaller than 1 for the right-side components (k=5, 6, 7). Further, $s_c^k$ (k=7, 6, 5) is symmetrically similar to $s_c^k$ (k=1, 2, 3).

Symmetric Flipping

When the input face is largely lateral (i.e., viewed in profile or near profile), some facial components may be substantially occluded and/or have dramatic appearance changes. For example, as shown in FIG. 4 above for the pose category $P_1$, the left part of the face is almost not visible. Accordingly, the occluded part of the face cannot be effectively rectified by the geometric rectification technique discussed above. However, due to the bilateral symmetry of the human face, the opposite part of the face is visible. Thus, as discussed in the example of FIG. 4, even though the right eye is occluded, the left eye may be copied and flipped or transposed, and then geometric rectification may be applied, as described above, to approximate the appearance of the right eye. Thus, some implementations may generate a mirror image of the visible facial component to replace the counterpart occluded facial component on the other side of the face. In some implementations herein, the flipping operation is only performed on occluded facial portions in the extreme pose categories, such as pose categories $P_1$, $P_2$, $P_6$, and $P_7$.

Local Perturbation

Because the pose-adaptive scale factor $s_c^k$ is optimized using the entire set of training data (e.g., 200 or more different identities), the scale factor $s_c^k$ may not always be most appropriate for an individual input face image. Additionally, the landmark detection and pose estimation techniques herein may also introduce errors. Accordingly, to obtain more accurate geometric rectification for each input face, some implementations may carry out a local perturbation operation to refine a location x, and the scale factor $s_c^k$ of each facial component c based on the following equation:

$$s_c^{k*} = \operatorname{argmin}_{s_c^k} \sum \left| \tilde{I}_c^k - \tilde{I}_c^4 \right|, \tag{3}$$

where $|\cdot|$ is the raw pixel distance, and is the corresponding component of the 4th (frontal) template used in the pose estimation. Furthermore, it should be noted that while the above examples are described in the context of transforming an input image to a full frontal pose category, other implementations may transform an input image to any of the other pose categories. For example, if the input image is a full frontal pose, the input image may be transformed to a pose category $P_1$ image for comparing with one or more images in pose category $P_1$. Further, when two images are to be compared, a two-way transformation and comparison may be performed in which a first input image is transformed to a pose category of a second input image and the second input image is also transformed to the pose category of the first input image. In other implementations, all images to be compared may be transformed to a particular selected pose category, such as the full frontal pose category $P_4$. Other variations will also be apparent to those of skill in the art in view of the disclosure herein.

Two-Layer Descriptor Compression

As mentioned above, some implementations combine multiple low-level descriptors to provide an effective technique for increasing the robustness of the face representation herein. However, most conventional multi-descriptor combinations are affected by increasing feature size or compression model size. Accordingly, in order to compress the combined descriptors without substantial additional memory and/or computation costs, some implementations herein apply the following two-layer compression that may adopt variant PCA techniques in different compression layers.

Multi-Descriptor Combination

Some implementations herein may extract at least four low-level descriptors, i.e., LBP, SIFT, Gabor, and one or more LE descriptors, as discussed above to form a combined or concatenated descriptor. In some implementations, for the LBP descriptor, some instances use 8 circular neighbor sets and 59-code uniform encoding. Further, in some instances of the SIFT and Gabor descriptors, the low-level feature vectors may both be quantized into 32 discrete codes. Additionally, in some instances of the LE descriptor, some implementations herein use 256 codes and four sampling patterns.

Figure 5:
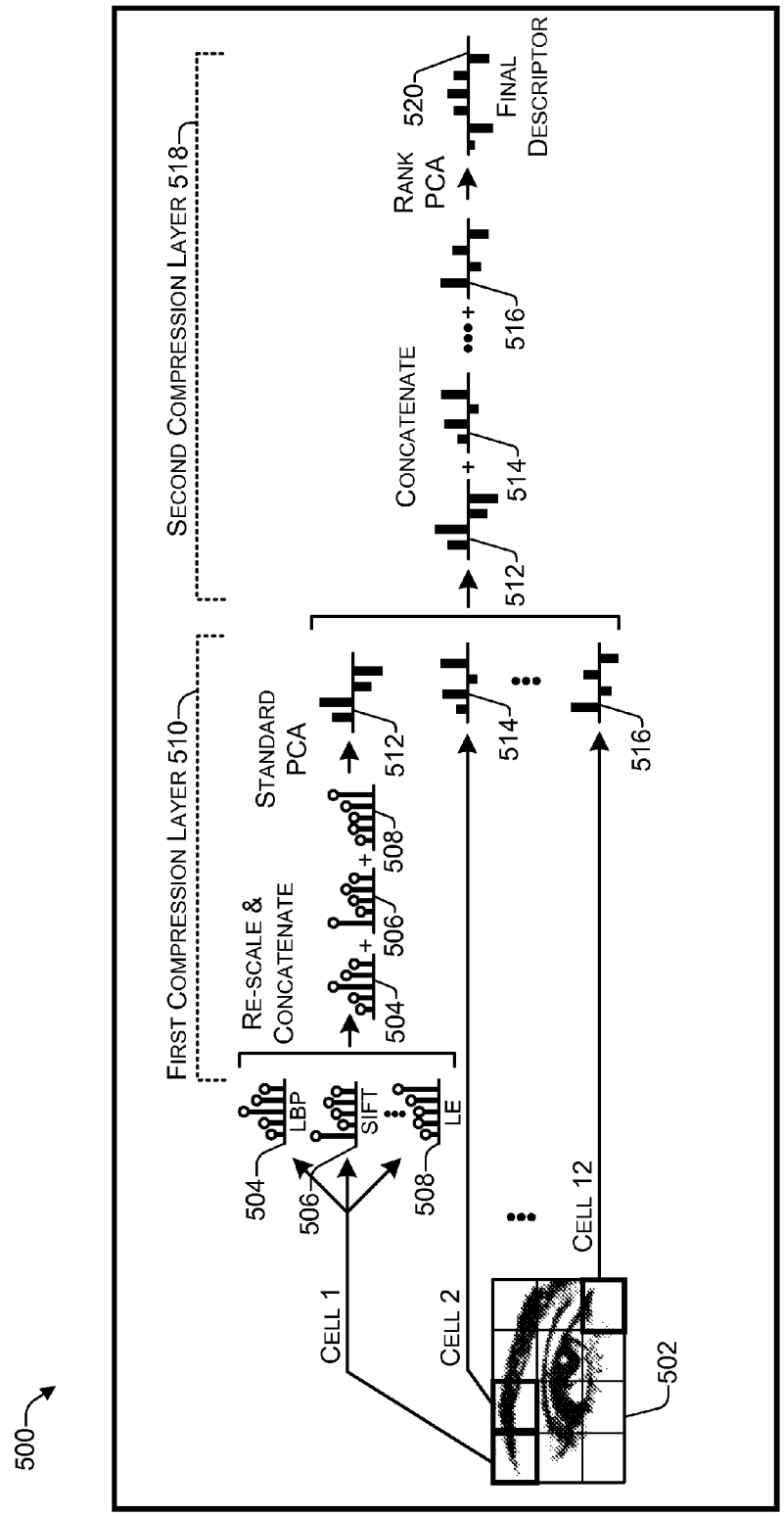
FIG. 5 illustrates an example framework for two-layer compression according to some implementations.

FIG. 5 illustrates an example of a framework 500 for descriptor combination and two-layer compression according to some implementations. The framework 500 may be executed by a computing device or other particular machine specifically configured with processor-executable instructions, as discussed additionally below. In some implementations, each facial component may be divided into a plurality of cells. In the illustrated example, a right-eye facial component 502 is divided into 3×4=12 cells (referred to as cell 1 through cell 12 in FIG. 5). Each descriptor of the multiple descriptors may extract a (code) histogram from each cell. Additionally, in some implementations, the descriptors may be of incompatible scales. Accordingly, to address the incompatible scale issue created by using different types of descriptors, some implementations herein may re-scale each descriptor result using a corresponding code number before concatenating each of the descriptor results into a combined feature vector. For example, in some implementations, the LBP descriptor is multiplied by 59 as the code number and the LE descriptor is multiplied by 256 as the code number.

Simply combining multiple descriptors will result in a very high dimensional vector. For example, if seven low-level descriptors (LBP, SIFT, Gabor, and 4 variant LE's) are used and were simply combined, the resulting dimension would be: (59+32+32+256×4) codes×12 cells, which equals a dimension of 13,764 for each facial component, and 13,764× 12 facial components=165,188 for each input face when twelve facial components are used. Additionally, if this high dimensional vector were to be compressed using standard PCA techniques, it would also require a considerably large PCA project matrix. Accordingly, some implementations herein apply a variant of two-layer PCA compression to address these issues.

Two-Layer Compression

In conventional PCA compression, a few principal components (e.g., eigenvectors of a covariance matrix) having the largest eigenvalues are selected to span the PCA subspace. By selecting these principal components, most noise encoded in the trailing eigenvectors is removed. However, the standard PCA subspace may mix both signals of intrapersonal transformation and the intrinsic difference between different persons. Thus, the subspace of standard PCA is good at removing noise and reducing data dimension, but weak in discriminative ability. In view of this, some implementations herein may apply whitening and normalization as two operations which may provide improved performance over standard PCA.

Typically, each dimension of the PCA subspace may have significantly different variability. According to some implementations herein, to reduce the domination effect of any dimension, the whitening operation re-scales each dimension by its variation value. For example, since the PCA compression herein may determine eigenvectors and eigenvalues of the covariance matrix, the whitening operation may include re-scaling of the eigenvectors by the corresponding eigenvalues. Additionally, according to some implementations herein, the normalization operation normalizes the feature vector (in the PCA subspace) into unit length and applies an L2 metric to measure the vector similarity. For example, in some implementations, the resulting feature vector is normalized to make the feature vector's norm equal to "1." After the normalization, the L2 distance between vectors may be the angle difference of the original vectors, which makes implementations herein more discriminative. For convenience, this technique of adding whitening and normalization operations to standard PCA is referred to herein as "Rank PCA."

After whitening and normalization, the absolute values of the components in the Rank PCA subspace include little information about the original distance measure. In other words, only the relative rank relations (the relative magnitudes of the facial components) is completely preserved, and thus, "Rank PCA" is an appropriate term for this technique.

To effectively combine multiple descriptors, some implementations herein adopt two-layer PCA-based compression. Since the Rank PCA technique disclosed herein has been determined to significantly outperform standard PCA techniques on discriminative ability, some implementations herein apply both standard PCA and Rank PCA in the two-layer compression to increase the discriminative ability of the final descriptor. For example, as illustrated in FIG. 5, for each cell 1-12 of each facial component, multiple descriptors are used to determine features of each cell of each facial component.

In some implementations, initially, the extracted features of each cell 1-12 may be expressed as a histogram, such as features 504 extracted using the LBP descriptor, features 506 extracted using the SIFT descriptor, and features 508 extracted using the LE descriptor. Implementations herein may subsequently rescale and concatenate the features extracted using each of the descriptors, as described above. Next, in a first compression layer 510 the concatenated histograms 504, 506 and 508 of multiple descriptors within each cell are compressed using standard PCA to generate a compressed vector 512 that represents the features of cell 1 according to the multiple descriptors. Similarly, a compressed vector 514 may be determined for cell 2, and so forth for each of the cells of the facial component 502, including a compressed vector 516 determined for cell 12. Next, the compressed vectors 512, 514, . . . , 516 from the first compression layer 510 may be concatenated and further compressed in the second compression layer 518 using the Rank PCA technique described above that includes the whitening and normalizing operations. The second compression layer 518 produces a final compact descriptor 520 that represents the facial component 502. As an example, some implementations herein may select a dimensionality of 100 for the compressed vector representing each cell in the first compression layer PCA, and may preserve a dimensionality of 300 for the final descriptors in the second compression layer PCA for representing each facial component.

It may be difficult for the first compression layer to directly employ "strong" subspace learning with the high-dimensional and noisy raw (combined) descriptors. After the first layer extracts the low-dimensional and informative subspace, the second layer may carry out discriminative learning. However, according to implementations herein, the first compression layer is prevented from destroying a substantial amount of the information in the raw feature space, so some implementations herein do not use the Rank PCA at the first compression layer. The two-layer compression framework 500 also provides benefits with respect to memory and computation costs. For example, as compared with the 13,764 dimensional raw descriptor, the resulting final descriptor 520 may be very compact. Furthermore, the two-layer compression technique herein also reduces the PCA model size. For example, in some implementations, the model size of the two-layer-PCA may be approximately 1 MB while the model size of a single-layer PCA may be around 4 MB, which may be an important distinction on some low-end or mobile devices. Thus, implementations herein provide a pose-robust representation for face recognition, using both pose-adaptive alignment and two-layer compression. The resulting representation is highly discriminative and compact.

Example Architecture

Figure 6:
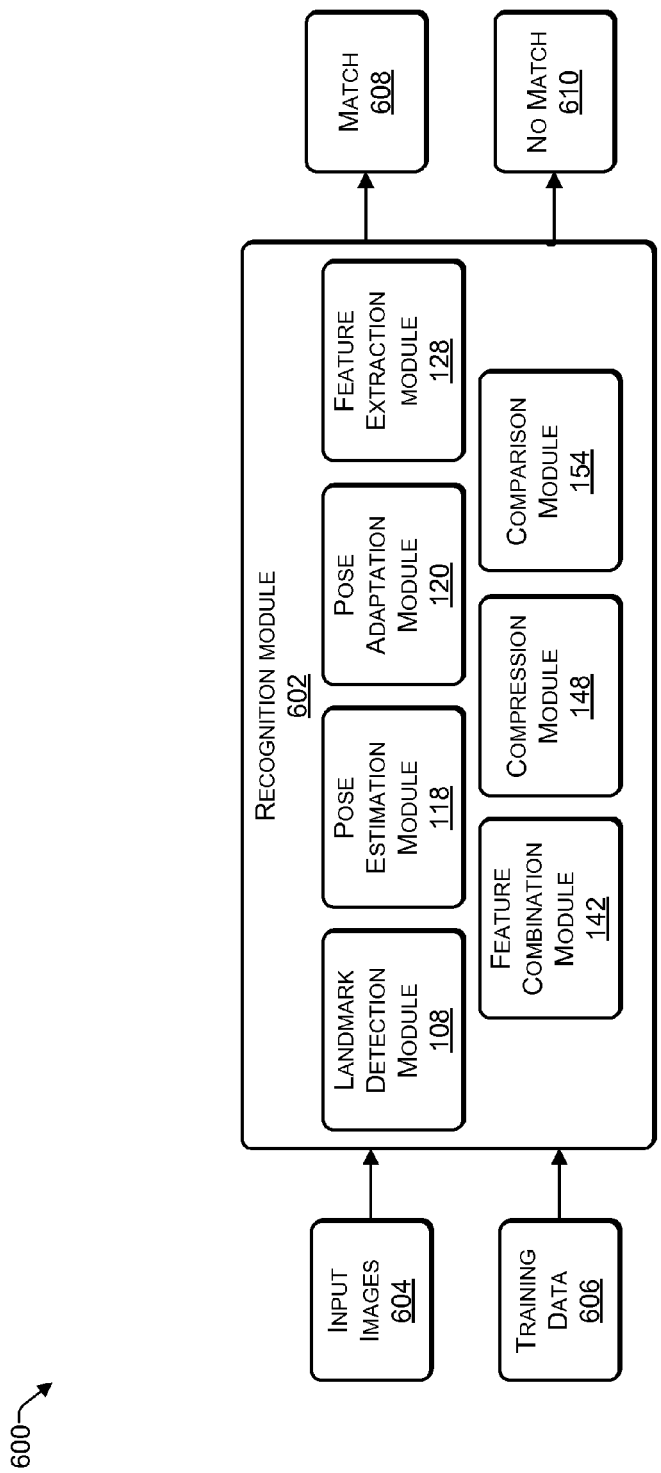
FIG. 6 is a block diagram of an example architecture for facial recognition according to some implementations.

FIG. 6 is a block diagram of an example architecture 600 including a recognition module 602 according to some implementations herein. In the illustrated example, the recognition module 602 may be executed according to the frameworks 100 and 500 described above. For example, the recognition module 602 may include a plurality of computer-readable, processor-executable instructions and modules that may specifically program one or more processors to form a particular machine for attaining the frameworks, processes and functions described herein.

The recognition module 602 may include the landmark detection module 108, the pose estimation module 118, the pose-adaptation module 120, the feature extraction module 128, the feature combination module 142, the compression module 148 and the comparison module 154. According to some implementations, the recognition module 602 may receive one or more input images 604. The landmark detection module 108 may detect one or more facial landmarks in the one or more input images 604. The pose estimation module 118 may estimate a pose of the one or more input images 604 based, at least in part, on the one or more facial landmarks and training data 606. The pose adaptation module 120 may transform at least a portion of the one or more input images 604 to a different pose category, such as through geometric rectification, symmetric flipping and/or local perturbation, as described above. The feature extraction module 128 may use one or more descriptors to extract features from the input image. The feature combination module 142 may concatenate the extracted features from multiple descriptors to generate a combined feature vector. The compression module 148 may compress the combined feature vector to obtain a final descriptor. The comparison module 154 may use the final descriptor to compare the input image with one or more other images to determine whether there is a match as indicated at block 608, or no match, as indicated at block 610.

Furthermore, while FIG. 6 sets forth one example of a suitable architecture for a recognition module 602, numerous other possible architectures, frameworks, systems and environments will be apparent to those of skill in the art in view of the disclosure herein. Additionally, while the examples herein have been described in the environment of facial recognition, other implementations may be directed to other types of computer visualization and recognition applications. Thus, the implementations herein may be extended to other types of intelligent vision systems.

Example Processes

Figure 7:
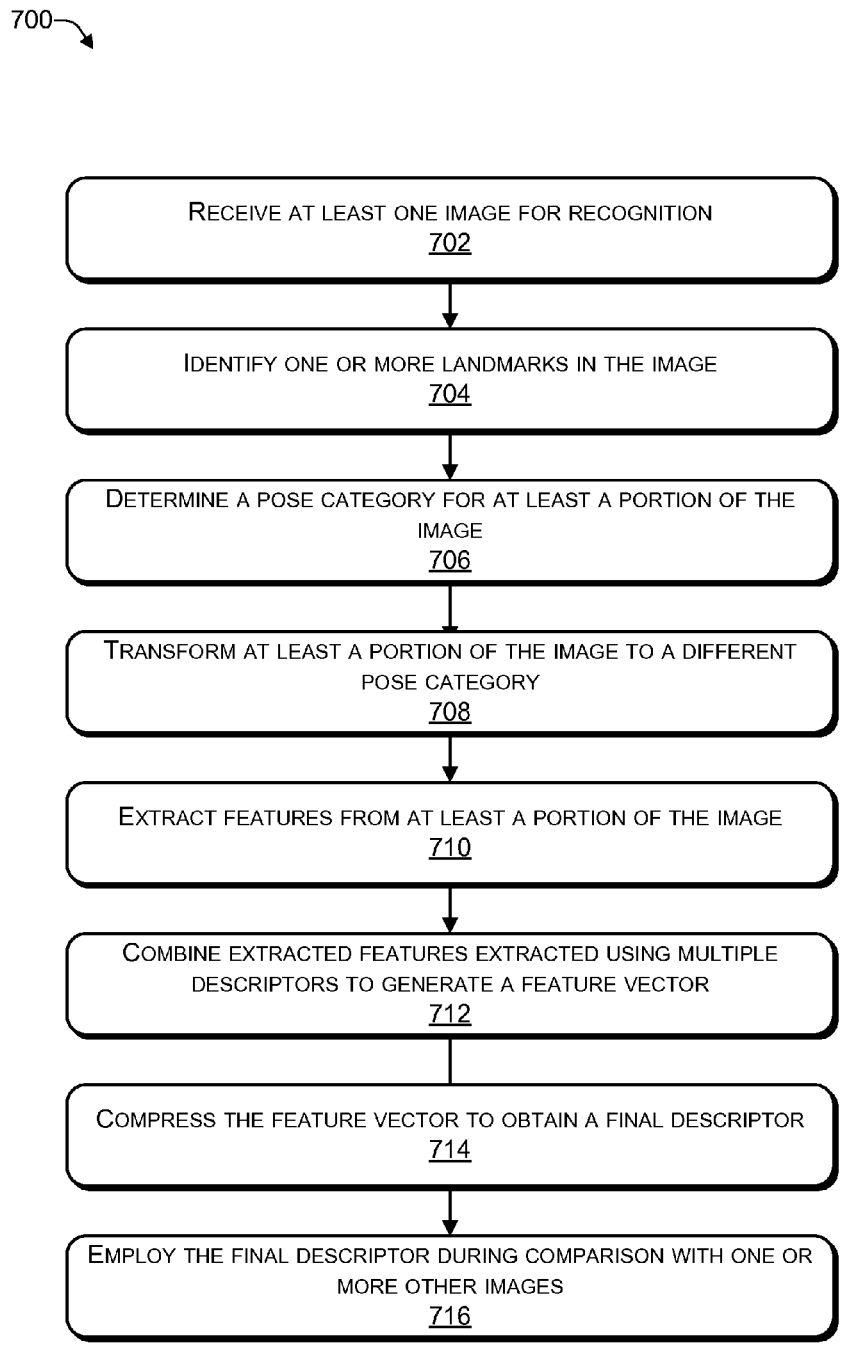
FIG. 7 is a flow diagram of an example process that includes transformation of at least a portion of an input image according to some implementations.
Figure 8:
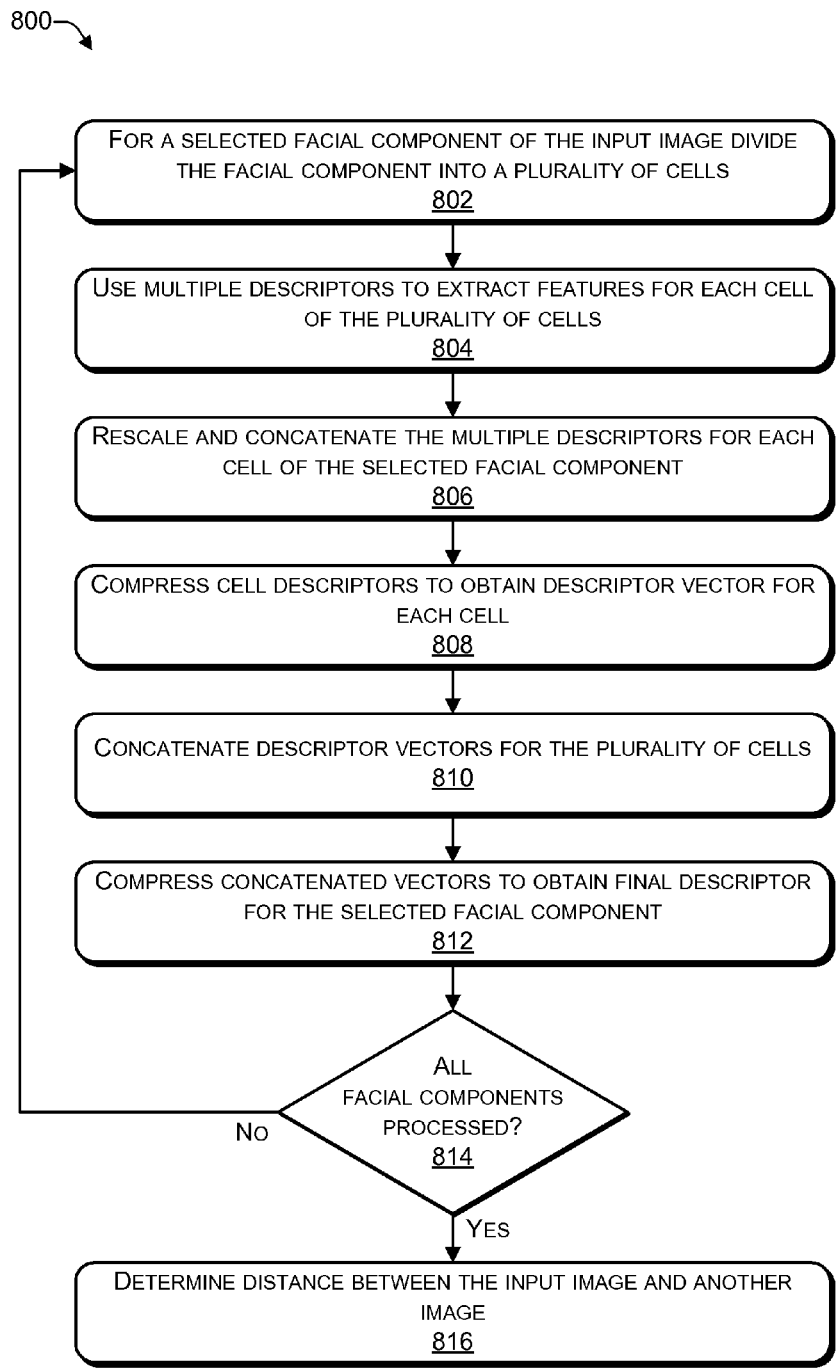
FIG. 8 is a flow diagram of an example process for two-layer compression of image data according to some implementations.

FIG. 7 is a flow diagram of an example process 700 for facial recognition that includes transforming at least a portion of an image for comparison with one or more other images according to some implementations. Additionally, FIG. 8 is a flow diagram of an example process 800 that includes two-layer compression according to some implementations. In the flow diagrams of FIGS. 7 and 8, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 700 and 800 are described with reference to the frameworks 100 and 500, respectively, described above, although other models, frameworks, systems and environments may implement these processes.

At block 702, the framework 100 receives at least one image for recognition. For example, the framework 100 may receive an input image 102 for comparing with one or more other images 104 to determine whether there is a match between the input and the one or more other images.

At block 704, the framework identifies one or more landmarks in the input image. For example, a landmark detection module may identify one or more landmarks in the input image such as the centers of the eyes, the corners of the mouth, or the like.

At block 706, the framework determines a pose category for at least a portion of the input image. For example, a pose estimation module may apply one or more descriptors to the input image to match the input image to one or more pose category templates for determining a pose category for the input image. As mentioned above, the pose category templates may be generated using a set of training data containing a plurality of identities, each identity containing a plurality of images of an individual in different pose categories.

At block 708, the framework transforms at least a portion of the input image to a different pose category. For example, in some implementations, the pose adaptation module may divide a face in the input image into one or more of facial components. The pose adaptation module may transform the one or more facial components of the input image to a different pose category through the use of at least one of geometric rectification, symmetric flipping, and/or local perturbation. As mentioned above, scale factors for use in the geometric rectification may be determined using the set of training data containing the plurality of identities.

At block 710, the framework extracts features from at least a portion of the input image using one or more descriptors. For example, a feature extraction module may use multiple low-level descriptors to extract various features from the transformed facial components for use during the comparison and matching with another image.

At block 712, the framework combines the features extracted using multiple descriptors to generate a combined feature vector. For example, a feature combination module may combine multiple histograms generated by multiple descriptors to obtain a combined feature vector representative of a facial component.

At block 714, the framework compresses the feature vector to obtain a file descriptor representative of a facial component. For example, in some implementations, a compression module may compress the combined feature vector to generate final descriptors representative of each facial component. Additionally, in some implementations, the compression module may use a two-layer compression technique to obtain a more discriminative final descriptor for each facial component.

At block 716, the framework employs the file descriptor very comparison with one or more other images. For example, a comparison module may compare the final descriptor generated for each facial component with corresponding final descriptors similarly generated for corresponding facial components of one or more other images with which the input image is being compared. In some implementations, the comparison module may use a linear support vector machine ("SVM") to determine the similarity distance based on a fusion of the component-wise L2 distances. Although, other comparison techniques may be used in other implementations herein.

FIG. 8 is a flow diagram of an example process 800 for two-layer compression according to some implementations.

At block 802, for a selected facial component of the input image, the framework 500 may divide the facial component into a plurality of cells. For example, following transformation of the facial component into a desired pose category, the facial component may be divided into 12 individual cells.

At block 804, the framework may use multiple descriptors to extract features for each cell of the plurality of cells. For example, the feature extraction module 128 may use the multiple descriptors described above to extract features for each of the 12 cells.

At block 806, the framework may rescale and concatenate the multiple descriptors for each cell of the selected facial component. For example, the feature combination module 142 may rescale the results of the multiple descriptors and combine the multiple descriptors to generate a combined feature vector for each of the 12 cells of the selected facial component.

At block 808, the framework may compress the cell descriptors to obtain a combined descriptor vector for each of the cells. For example, the compression module 148 may compress the combined feature vector for each of the 12 cells to obtain a compressed feature vector for each of 12 cells. In some implementations, the compression module may use a standard PCA compression technique to compress the combined feature vector.

At block 810, the framework may concatenate the compressed feature vectors for each cell to obtain a concatenated feature vector representative of the selected facial component. For example, the feature combination module 142 may concatenate the compressed feature vectors for each of the 12 cells to obtain the concatenated feature vector for the selected facial component.

At block 812, the framework may compress the concatenated feature vector to obtain a final descriptor for the selected facial component. For example, feature compression module 148 may compress the concatenated feature vector to obtain the final descriptor for the selected facial component. In some implementations, the compression module 148 may use Rank PCA, which is a variant of PCA compression that includes a whitening operation and a normalizing operation.

At block 814, the process determines whether all facial components have been processed. If so, the process moves on to block 816; if not, the framework may return to block 802 to select another facial component for processing.

At block 816, the when all facial components have been processed, the framework may determine a distance between the input image and one or more other images. In some implementations, the comparison module 154 may compare the final descriptor for each facial component in the input image with final descriptors for corresponding facial components from one or more other images. For example, in some implementations, may use a linear support vector machine ("SVM") to determine the similarity distance based on a fusion of the component-wise L2 distances. Numerous other suitable comparison techniques will be apparent to those of skill in the art in view of the disclosure herein.

Example Computing Device and Environment

Figure 9:
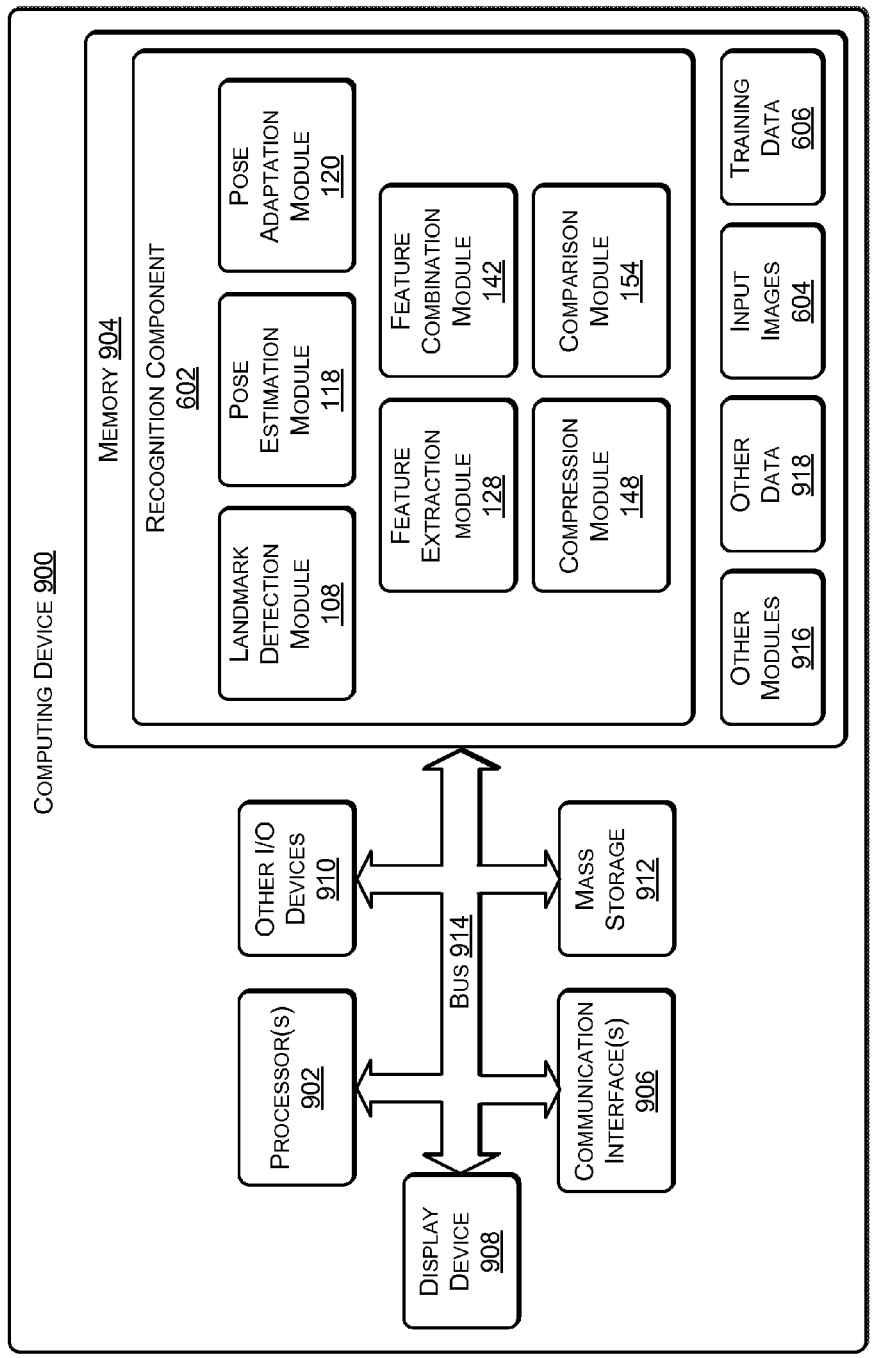
FIG. 9 is a block diagram of an example computing device and environment according to some implementations.

FIG. 9 illustrates an example configuration of a computing device 900 and environment that can be used to implement the modules and functions described herein. The computing device 900 may include at least one processor 902, a memory 904, communication interfaces 906, a display device 908, other input/output (I/O) devices 910, and one or more mass storage devices 912, able to communicate with each other, such as via a system bus 914 or other suitable connection.

The processor 902 may be a single processing unit or a number of processing units, all of which may include single or multiple computing units or multiple cores. The processor 902 can be implemented as one or more microprocessors, microcomputers, microcontrollers, digital signal processors, central processing units, state machines, logic circuitries, and/or any devices that manipulate signals based on operational instructions. Among other capabilities, the processor 902 can be configured to fetch and execute computer-readable instructions stored in the memory 904, mass storage devices 912, or other computer-readable media.

Memory 904 and mass storage devices 912 are examples of computer storage media for storing instructions which are executed by the processor 902 to perform the various functions described above. For example, memory 904 may generally include both volatile memory and non-volatile memory (e.g., RAM, ROM, or the like). Further, mass storage devices 912 may generally include hard disk drives, solid-state drives, removable media, including external and removable drives, memory cards, flash memory, floppy disks, optical disks (e.g., CD, DVD), a storage array, a network attached storage, a storage area network, or the like. Both memory 904 and mass storage devices 912 may be collectively referred to as memory or computer storage media herein, and may be a non-transitory media capable of storing computer-readable, processor-executable program instructions as computer program code that can be executed by the processor 902 as a particular machine configured for carrying out the operations and functions described in the implementations herein.

The computing device 900 may also include one or more communication interfaces 906 for exchanging data with other devices, such as via a network, direct connection, or the like, as discussed above. The communication interfaces 906 can facilitate communications within a wide variety of networks and protocol types, including wired networks (e.g., LAN, cable, etc.) and wireless networks (e.g., WLAN, cellular, satellite, etc.), the Internet and the like. Communication interfaces 906 can also provide communication with external storage (not shown), such as in a storage array, network attached storage, storage area network, or the like.

A display device 908, such as a monitor may be included in some implementations for displaying information and images to users. Other I/O devices 910 may be devices that receive various inputs from a user and provide various outputs to the user, and may include a keyboard, a remote controller, a mouse, a printer, audio input/output devices, and so forth.

Memory 904 may include modules and components for pose-robust recognition according to the implementations herein. In the illustrated example, memory 904 includes the recognition module 602 described above that affords functionality for performing the recognition functions described herein. For example, as discussed above, recognition module 602 may include the landmark detection module 108, the pose estimation module 118, the pose adaptation module 120, the feature extraction module 128, the feature combination module 142, the compression module 148 and the comparison module 154 described above. Memory 904 may also include other data and data structures described herein, such as the training data 606 and one or more input images 604, which may include the input image 102 and/or the one or more other images 104 discussed above. Memory 904 may further include one or more other modules 916, such as an operating system, drivers, communication software, or the like. Memory 904 may also include other data 918, such as data stored while performing the functions described above and data used by the other modules 916.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Although illustrated in FIG. 9 as being stored in memory 904 of computing device 900, recognition module 602, or portions thereof, may be implemented using any form of computer-readable media that is accessible by computing device 900. As used herein, "computer-readable media" includes, at least, two types of computer-readable media, namely computer storage media and communications media.

Computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A method comprising:
    under control of one or more processors configured with executable instructions,
    determining a first pose category of at least a portion of a first image from among a plurality of pose categories;
    transforming at least the portion of the first image to a second pose category corresponding to a second image to obtain a transformed image, wherein at least a portion of the transformed image is divided into a plurality of cells;
    using multiple descriptors to extract features for each cell of the portion of the transformed image;
    rescaling the results of the multiple descriptors determined for each cell;
    concatenating the rescaled results to obtain a combined feature vector for each cell of the plurality of cells;
    compressing the combined feature vectors to obtain a compact final descriptor representative of at least the portion of the transformed image; and
    comparing the transformed image with the second image to determine, at least in part, whether the first image is a match with the second image.

2. The method as recited in claim 1, the transforming at least the portion of the first image to the second pose category further comprising applying geometric rectification to at least the portion of the first image based, at least in part, on an a scale factor determined from training data.

3. The method as recited in claim 2, wherein the training data comprises a plurality of sets of images including different pose categories of the plurality of pose categories, the method further comprising optimizing the scale factor based, at least in part, on the training data.

4. The method as recited in claim 2, further comprising performing local perturbation to refine a location of at least the portion of the first image and the scale factor based on pose categories and landmarks determined from the training data.

5. The method as recited in claim 1, the transforming at least the portion of the first image to the second pose category further comprising:
    determining that at least a portion of a face in the first image is at least partially occluded;
    selecting a symmetrical portion of the face the from an opposite side of the face;
    flipping the symmetrical portion of the face; and including in the transformed image the flipped symmetrical portion of the face in substitution for at least the portion that is at least partially occluded.

6. The method as recited in claim 1, the determining the first pose category further comprising:
  generating based, at least in part, on training data a plurality of pose category templates, each pose category template representing a different pose category; and
  comparing the first image with the plurality of pose category templates to identify a pose category for the first image based on similarity to one of the pose category templates.

7. The method as recited in claim 1, the method further comprising:
  dividing the first image into a plurality of facial components;
  for each facial component performing the transforming to transform the facial component from the first pose category to the second pose category; and
  the comparing further comprising comparing a final descriptor determined for each facial component with a corresponding facial component from the second image.

8. The method as recited in claim 1, wherein:
  the compressing comprises compressing the combined feature vector for each cell using standard principal component analysis (PCA) compression to obtain a compact descriptor result for each cell.

9. The method as recited in claim 8, wherein the combined feature vector for each cell represents a first combined feature vector, and the compressing further comprising:
  concatenating the compact descriptor result for each cell to obtain a second combined feature vector representative of at least the portion of the transformed image; and
  compressing the second combined feature vector using a variant PCA compression to obtain the compact final descriptor representative of at least the portion of the transformed image, wherein the variant PCA compression includes a whitening operation and a normalizing operation.

10. The method as recited in claim 1, wherein the results of the multiple descriptors determined for each cell are codes.

11. The method as recited in claim 1, further comprising rescaling the results of the multiple descriptors determined for each cell with an associated code number prior to concatenation.

12. Computer-readable storage media maintaining instructions executable by one or more processors to perform operations comprising:
  receiving an image;
  dividing a face in the image into a plurality of facial components;
  using multiple descriptors to extract features from a facial component of the plurality of facial components;
  rescaling the features extracted using the multiple descriptors;
  concatenating the results of the rescaling to obtain a combined feature vector representative of the facial component; and
  compressing results of the concatenating to obtain a compact final descriptor representative of the facial component.

13. The computer-readable storage media as recited in claim 12, the image comprising a first image, and the operations further comprising:
  transforming the facial component of the plurality of facial components from a first pose category to a second pose category;
  comparing the compact final descriptor representative of the facial component of the face in the image with a corresponding analogous facial component of a second image corresponding to the second pose category to determine, at least in part, whether there is a match between the first image and the second image.

14. The computer-readable storage media as recited in claim 13, the operations further comprising:
  prior to the transforming, identifying one or more facial landmarks in the face in the first image; and
  determining that the face in the first image corresponds to the first pose category based, at least in part on the facial landmarks.

15. The computer-readable storage media as recited in claim 14, the transforming comprising geometric rectification of the facial component based on a global affine transformation to bring the face into a position corresponding to the second pose category.

16. The computer-readable storage media as recited in claim 15, the transforming including application of a scale factor for performing geometric rectification, the operations further comprising optimizing the scale factor using training data including a plurality of identities, each identity including images of an individual in different pose categories.

17. A computing device comprising:
  one or more processors in operable communication with computer-readable media;
  a feature extraction module maintained on the computer-readable media and executed on the one or more processors to use multiple descriptors to extract features from a facial component of an input image;
  a compression module maintained on the computer-readable media and executed on the one or more processors to compress the features extracted using the multiple descriptors to obtain a final descriptor representative of the facial component; and
  a feature combination module maintained on the computer-readable media and executed on the one or more processors to rescale the features extracted using the multiple descriptors with an associated code number and concatenate the features extracted using the multiple descriptors to obtain a combined feature vector representative of at least a portion of the facial component.

18. The computing device as recited in claim 17, wherein the compression module is configured to apply a two-layer compression that compresses features extracted from a plurality of cells of the facial component using a first compression technique to obtain a descriptor representative of each cell, and that compresses a concatenation of the descriptors representative of each cell to obtain a final descriptor representative of the facial component.

19. The computing device as recited in claim 18, wherein a first layer of the two-layer compression is a standard principal component analysis (PCA) compression and the second layer of the two-layer compression incorporates at least one of a whitening operation or a normalizing operation into PCA compression.

20. The computing device as recited in claim 17, further comprising:
  a pose estimation module maintained on the computer-readable media and executed on the one or more processors to receive the input image and determine a first pose category for the input image from among a plurality pose categories; and a pose adaption module maintained on the computer-readable media and executed on the one or more processors to transform the facial component of the input image from the first pose category to a different pose category of the plurality of pose categories.

* * * * *